(12) United States Patent
Santi et al.

(10) Patent No.: US 9,919,873 B2
(45) Date of Patent: Mar. 20, 2018

(54) FEEDING UNIT FOR FEEDING SEALED PACKS OF POURABLE FOOD PRODUCTS

(71) Applicant: Tetra Laval Holdings & Finance S.A., Pully (CH)

(72) Inventors: Franco Santi, Modena (IT); Giorgio Mattioli, Modena (IT); Alessandro Galata, Latina Scalo (Latina) (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/106,986

(22) PCT Filed: Nov. 25, 2014

(86) PCT No.: PCT/EP2014/075465
§ 371 (c)(1),
(2) Date: Jun. 21, 2016

(87) PCT Pub. No.: WO2015/096942
PCT Pub. Date: Jul. 2, 2015

(65) Prior Publication Data
US 2017/0001806 A1    Jan. 5, 2017

(30) Foreign Application Priority Data
Dec. 23, 2013 (EP) .................................... 13199498

(51) Int. Cl.
*B65G 19/00* (2006.01)
*B65G 19/26* (2006.01)
(Continued)

(52) U.S. Cl.
CPC ............ *B65G 19/265* (2013.01); *B65B 61/24* (2013.01); *B65B 61/28* (2013.01); *B65G 19/02* (2013.01); *B65G 19/245* (2013.01)

(58) Field of Classification Search
CPC ...... B65G 19/02; B65G 19/24; B65G 19/245; B65G 19/26; B65G 19/265
(Continued)

(56) References Cited

U.S. PATENT DOCUMENTS 2,443,010 A * 6/1948 Petskeyes ............ B65G 19/265
                                                198/732
4,510,732 A * 4/1985 Lothman ................. B65B 61/24
                                                493/218
(Continued)

FOREIGN PATENT DOCUMENTS

DE    24 00 809 A1    7/1975
DE    24 18 249 A1    10/1975
(Continued)

OTHER PUBLICATIONS

*International Search Report (PCT/ISA/210) dated Jan. 30, 2015, by the European Patent Office as the International Searching Authority for International Application No. PCT/EP2014/075465.

*Primary Examiner* — William R Harp
(74) *Attorney, Agent, or Firm* — Buchanan Ingersoll & Rooney PC

(57) ABSTRACT

There is described a feeding unit for feeding at least one sealed pack of pourable food products to a folding unit configured to form folded packages from relative pack; feeding unit comprising: a feeding conveyor; at least one push member movable cyclically along path and comprising, in turn, a wall adapted to contact pack; and a support for supporting push member on feeding conveyor; path comprising an inlet station at which push member receives, in use, pack, and an outlet station, at which push member discharges, in use, pack; path comprises a first curved stretch which defines outlet station; push member is connected to support in such a way that the movement of support along first portion causes the movement of wall towards feeding conveyor.

21 Claims, 6 Drawing Sheets

(51) Int. Cl.
  *B65B 61/24* (2006.01)
  *B65B 61/28* (2006.01)
  *B65G 19/02* (2006.01)
  *B65G 19/24* (2006.01)

(58) Field of Classification Search
  USPC .................. 198/725, 726, 728, 731, 732
  See application file for complete search history.

(56) References Cited

U.S. PATENT DOCUMENTS

| | | | | |
|---|---|---|---|---|
| 4,890,724 | A * | 1/1990 | Loewenthal | B65G 19/265 |
| | | | | 198/732 |
| 5,738,204 | A * | 4/1998 | Baumgartner | B65G 15/44 |
| | | | | 198/732 |
| 5,937,999 | A * | 8/1999 | Spatafora | B65G 19/265 |
| | | | | 198/728 |
| 5,966,899 | A * | 10/1999 | Fontanazzi | B65B 7/20 |
| | | | | 53/374.7 |
| 9,309,055 | B2 * | 4/2016 | Pedretti | B65B 43/52 |
| 2012/0198795 | A1 | 8/2012 | Mezzaro et al. | |
| 2014/0131173 | A1 | 5/2014 | Pedretti et al. | |

FOREIGN PATENT DOCUMENTS

| | | |
|---|---|---|
| EP | 0 887 261 A1 | 12/1998 |
| EP | 2 484 611 A2 | 8/2012 |
| EP | 2 586 715 A1 | 5/2013 |
| FR | 2 975 678 A1 | 11/2012 |

* cited by examiner

FEEDING UNIT FOR FEEDING SEALED PACKS OF POURABLE FOOD PRODUCTS

TECHNICAL FIELD

The present invention relates to a feeding unit for feeding sealed packs of pourable food products to a folding unit configured to form folded packages from the packs.

BACKGROUND OF INVENTION

Many liquid or pourable food products, such as fruit juice, UHT (ultra-high-temperature treated) milk, wine, tomato sauce, etc., are typically sold in packages made of sterilized packaging material.

A typical example is the parallelepiped-shaped package for liquid or pourable food products known as Tetra Brik Aseptic (registered trademark), which is formed by creasing and sealing laminated strip packaging material.

The packaging material has a multilayer structure comprising a base layer, e.g. of paper, covered on both sides with layers of heat-seal plastic material, e.g. polyethylene. In the case of aseptic packages for long-storage products, such as UHT milk, the packaging material may also comprise a layer of gas and light-barrier material, e.g. an aluminium foil, which is superimposed on a layer of heat-seal plastic material, and is in turn covered with another layer of heat-seal plastic material forming the inner face of the package ultimately contacting the food product.

Packages of this sort are normally produced on fully automated packaging machines, on which a continuous tube is formed from the web-fed packaging material. The web of packaging material is sterilized on the packaging machine, e.g. by applying a chemical sterilizing agent, such as a hydrogen peroxide solution, which, once sterilization is completed, is conveniently removed from the surfaces of the packaging material, e.g. evaporated by heating. The web thus sterilized is then maintained in a closed, sterile environment, and is folded and sealed longitudinally to form a tube, which is fed vertically with the food product.

In order to complete the forming operations, the tube is filled with the sterilized or sterile-processed food product, and is sealed and subsequently cut along equally spaced cross sections.

More precisely, the tube is sealed longitudinally and transversally to its own axis. From this sealing operation, pillow packs are obtained, which have a longitudinal seal and respective top and bottom transversal seals.

Each pack also comprises, for each top and bottom end portion, an elongated substantially rectangular fin formed by respective sealing bands; and a pair of substantially triangular flaps projecting from opposite sides of relative end portion and defined by respective trapezoidal walls.

The end portions are pressed towards each other by the folding unit to form flat opposite end walls of the pack, while at the same time folding the flaps of the top portion onto respective lateral walls of the main portion and the flaps of the bottom portion onto the bottom sealing line.

Packaging machines of the above type are known, on which the packs are turned into folded packages by automatic folding units.

Folding units are known, for example from EP-B-0887261 in the name of the same Applicant, which substantially comprise:

a chain conveyor for feeding packs continuously along a forming path from a supply station to an output station;

a number of folding devices arranged in fixed positions relative to the forming path and cooperating with packs to perform relative folding operations thereon;

a heating device acting on respective triangular flaps of each pack to be folded, to melt and seal them onto respective walls of the pack; and a pressing device cooperating with each pack to hold the triangular flaps in the respective folded positions as these portions cool.

The step of transferring and feeding packs to the inlet station of the folding unit is critical for proper operation of the folding unit.

In practice, the packs are typically formed and sealed with their longitudinal axis arranged vertically. Subsequently, the newly formed packs are received by a feeding conveyor, which drives the packs to the inlet station of the folding unit.

The feeding conveyor comprises, in turn: a first endless belt and a second endless belt, and a plurality of push members carried by the first endless belt and the second endless belt.

The first endless belt and the second endless belts are wound onto respective pulleys having, in use, corresponding vertical axes and define therebetween a passage, horizontal, in use, for the packs.

Still more precisely, each pack is advanced within the passage by a respective push member of the first endless belt and a respective push member of the second endless belt.

Each push member comprises, in turn, a cooperating surface, which contacts a relative pack to push it towards an outlet station of the feeding conveyor.

In order to ensure very smooth motion conditions for the pillow packs being fed to the receiving station of a folding unit, it has been proposed, in the European patent EP 2586715 in the name of the same Applicant, to shape the profile of the cooperating surface of each push members as an involute.

In this way, the packs, when are advanced towards the folding unit, are subjected to a substantially constant and homogeneous thrust, especially when they are released from the respective push members.

Even performing well, the above-identified solution leaves room for an improvement.

In particular, when the push members move in a substantially vertical plane, there is the risk that the involute-shaped cooperating surface of push members slides below the pillow packs, substantially behaving as respective wedges.

There is therefore the risk that the speed of the packs varies, when the packs are released by the push members, thus generating the risk of a suboptimal shaping of the corresponding folded packages.

A need is felt within the industry to feed the packs to the folding unit according an alternative way, which can meet the above-identified requirement.

DISCLOSURE OF INVENTION

It is therefore an object of the present invention to provide a feeding unit for feeding sealed packs of pourable food products to a folding unit and designed to meet the need identified above in a straightforward and inexpensive manner.

This object is achieved by a feeding unit as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Figure 1:
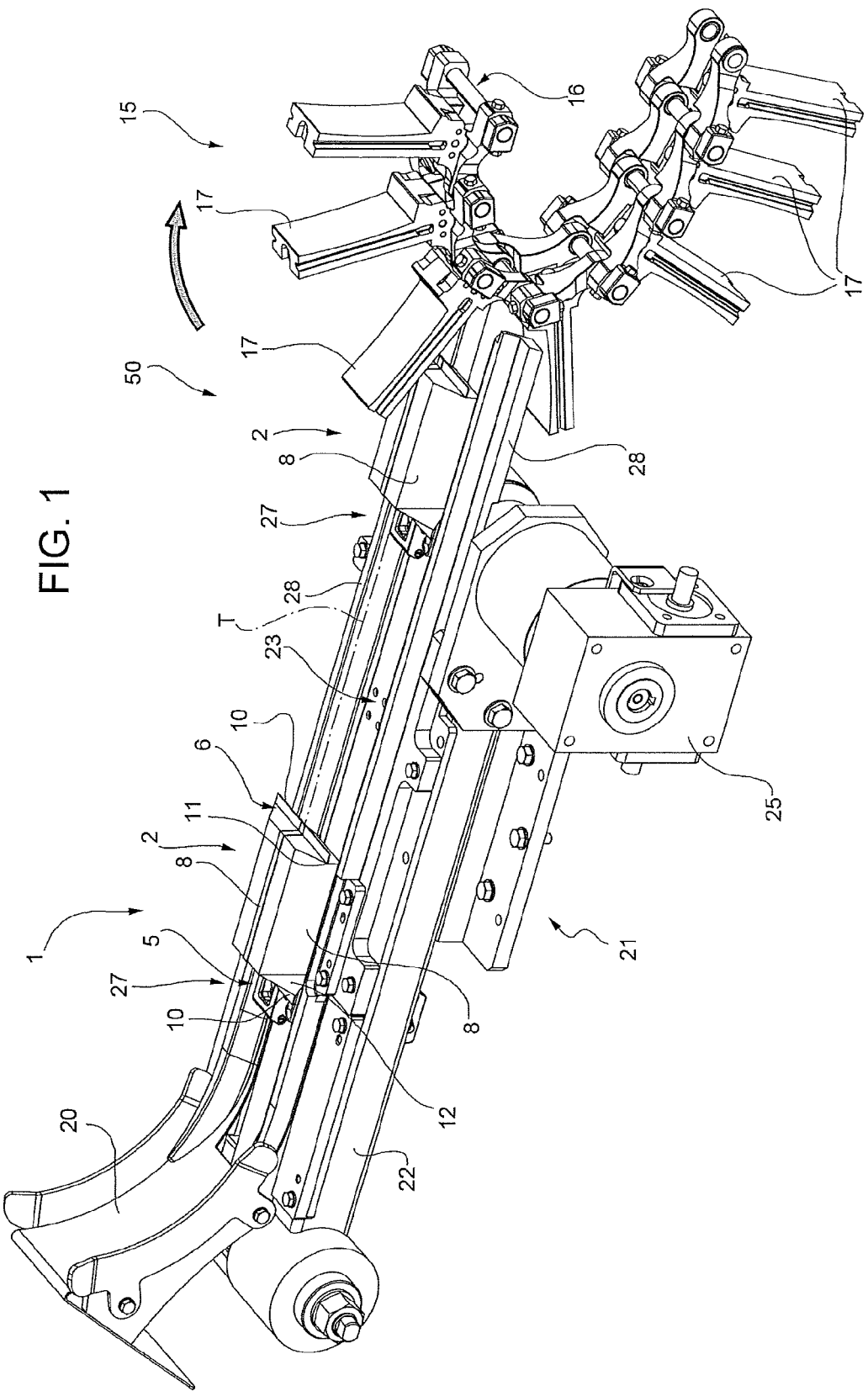
FIG. 1 is a perspective view of a feeding unit for pourable food product packaging machines, in accordance with the present invention.

Number 1 in FIGS. 1, 2 and 4 to 6 indicates as a whole a feeding unit for a packaging machine 50 for continuously producing sealed, substantially prismatic-shaped packages of a pourable food product, such as pasteurized or UHT milk, fruit juice, wine, etc., from a known tube, not shown, of packaging material.

The packaging machine 50 substantially comprises:
feeding unit 1 according to the invention, as shall be described in greater detail in the following; and
a folding unit 15 (only schematically shown in FIGS. 1, 2, 4 and 5).

The tube is formed in known manner upstream from unit 1 by longitudinally folding and sealing a known web (not shown) of heat-seal sheet material, which comprises a layer of paper material covered on both sides with layers of heat-seal plastic material, e.g. polyethylene. In the case of an aseptic package for long-storage products, such as UHT milk, the packaging material comprises a layer of oxygen-barrier material, e.g. aluminium foil, which is superimposed on one or more layers of heat-seal plastic material eventually forming the inner face of the package contacting the food product.

The tube of packaging material is then filled with the food product for packaging, and is sealed and cut along equally spaced cross sections to form a number of pillow packs 2 (shown in FIGS. 2, 4, 5, 6 and 7), which are then transferred to feeding unit 1.

For the sake of convenience, reference shall be made in the following to a specific pack geometry, which will be described in detail. However, it shall be apparent that this is intended merely as an example and that feeding unit 1 of the invention may be conveniently used with packs 2 of different geometries, provided that they can lie in a substantially horizontal position and that the feeding unit 1 may cooperate with a wall of the pack transversal to a horizontal plane in which the pack is advanced.

With reference to FIGS. 1 to 7, each pack 2 has an axis T, and comprises a substantially prismatic-shaped main portion 3 defined by a plurality, four in the embodiment shown, of walls 8; and opposite, respectively top and bottom, end portions 4, 5 tapering from portion 3 to respective sealing bands 6, 7, crosswise to axis T, of pillow pack 2.

Each end portion 4, 5 is defined at least partly by two walls 9 substantially in the form of an isosceles trapezium, sloping slightly towards each other with respect to a plane perpendicular to axis T, and having minor edges defined by end edges of respective walls 8 of portion 3, and major edges joined to each other by the respective sealing band 6, 7.

Figure 6:
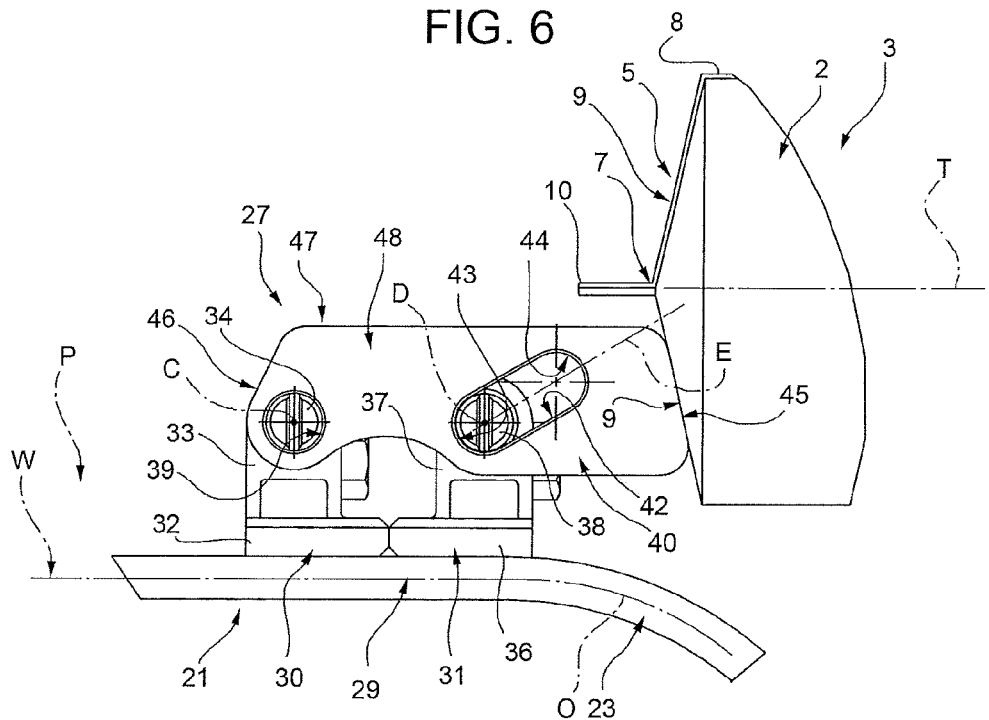
FIGS. 6 and 7 show, in a still more enlarged view, some components of FIGS. 4 and 5.
Figure 7:
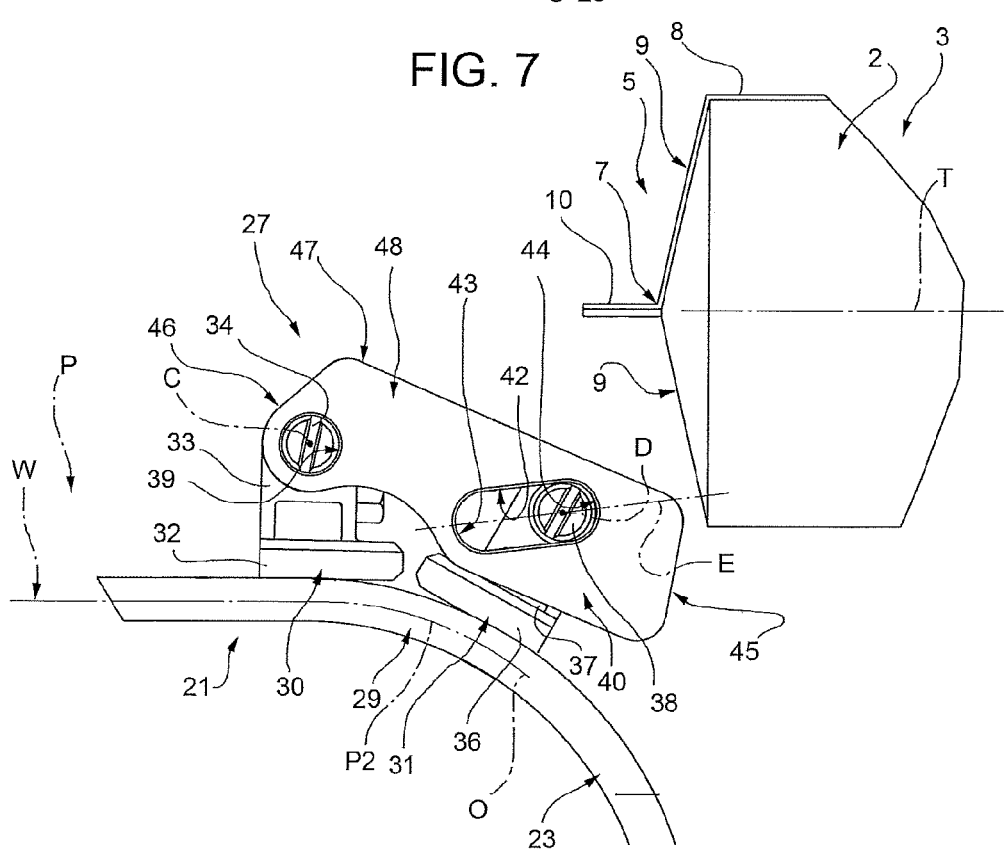

For each portion 4, 5, each pack 2 has an elongated, substantially rectangular fin 10 formed by the respective sealing band 6, 7; and two substantially triangular flaps 11, 12 projecting laterally from opposite sides of portion 3 and defined by end portions of relative walls 9 (FIGS. 6 and 7).

To form a package, folding unit 15 presses portions 4, 5 of pack 2 towards each other, whereas respective fins 10 are folded onto portions 4, 5; folds and seals flaps 11 (FIGS. 1 and 4) of portion 4 onto relative walls 8; and folds and seals flaps 12 of flattened portion 5.

Folding unit 15 substantially comprises (FIGS. 1 to 5):
a conveyor 16, a chain conveyor in the embodiment shown; and
a plurality of paddles 17, which protrude from respective links articulated to one another of conveyor 16, are arranged at a constant pitch along conveyor 16 and are adapted to convey a respective pack 2 along a folding path (not-shown), in which it is folded to from a corresponding finished package.

Feeding unit 1 comprises a curved-profile chute 20 (FIGS. 1 and 2) for receiving, from a relative forming and filling unit (not shown), newly formed packs 2 with their respective longitudinal axes arranged vertically, whereby the packs 2 are slidably brought to lie in a substantially horizontal plane.

Furthermore, feeding unit 1 comprises a feeding conveyor 21, arranged immediately downstream of chute 20.

Feeding conveyor 21 moves along a closed path P, which is formed by a work portion W and a return portion R.

In greater detail, path P comprises (FIG. 2):
an inlet station I, at which conveyor 21 receives packs 2 from chute 20; and
an outlet station O, at which conveyor 21 discharges pack 2 towards folding unit 15.

Work portion W of path P extends from inlet station I to outlet station O. Return portion R of path P extends from outlet station O to inlet station I.

Work portion W of path P comprises, in turn:
a rectilinear stretch P1, which extends as of inlet station I; and
a curved stretch P2, which terminates at outlet station O.

Figure 2:
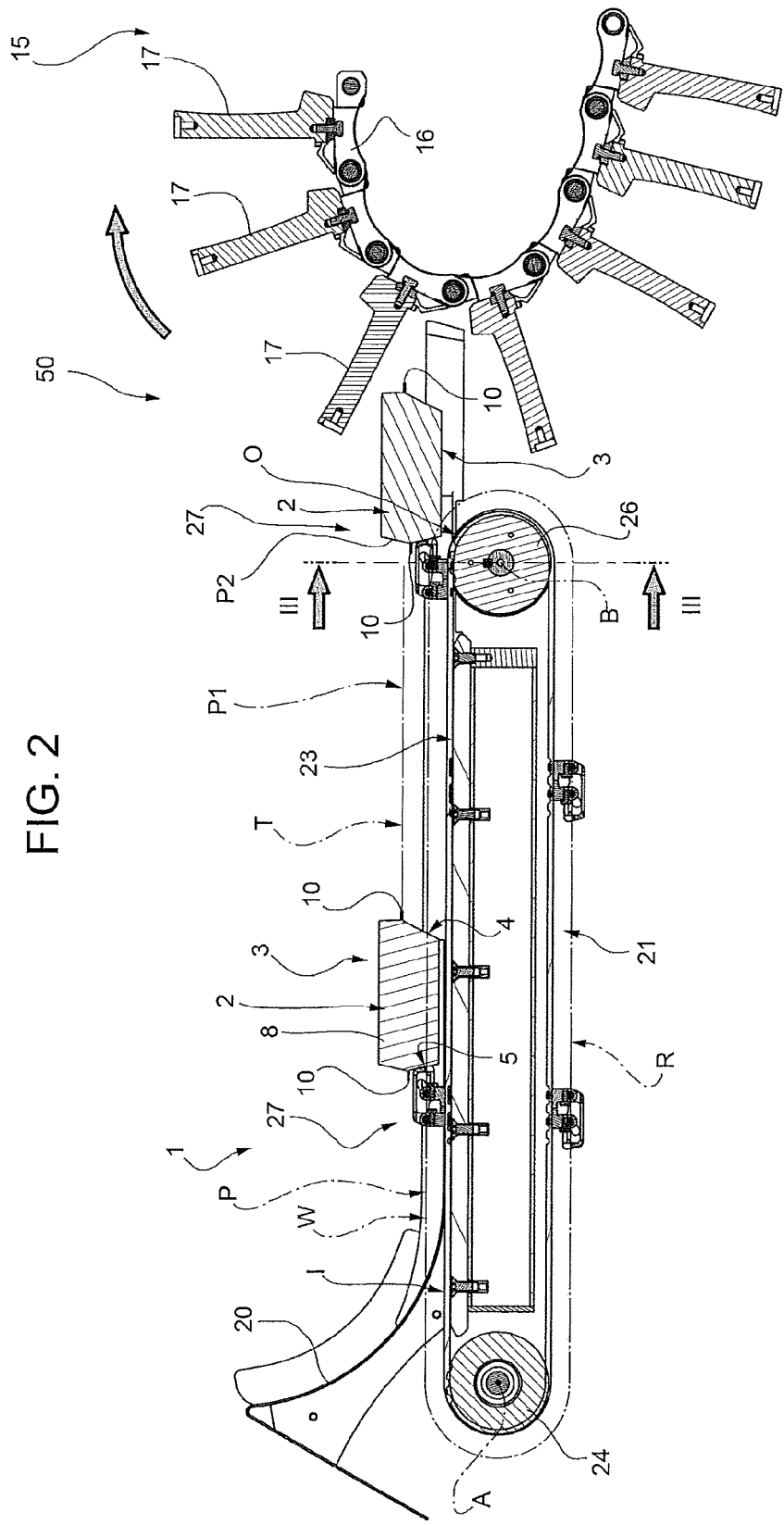
FIG. 2 is an enlarged lateral view of the feeding unit of FIG. 1 cooperating with a pillow pack, with parts removed for clarity.

Packs 2 are discharged at outlet station O with axes T parallel to stretch P1 (FIGS. 2 and 7).

Figure 3:
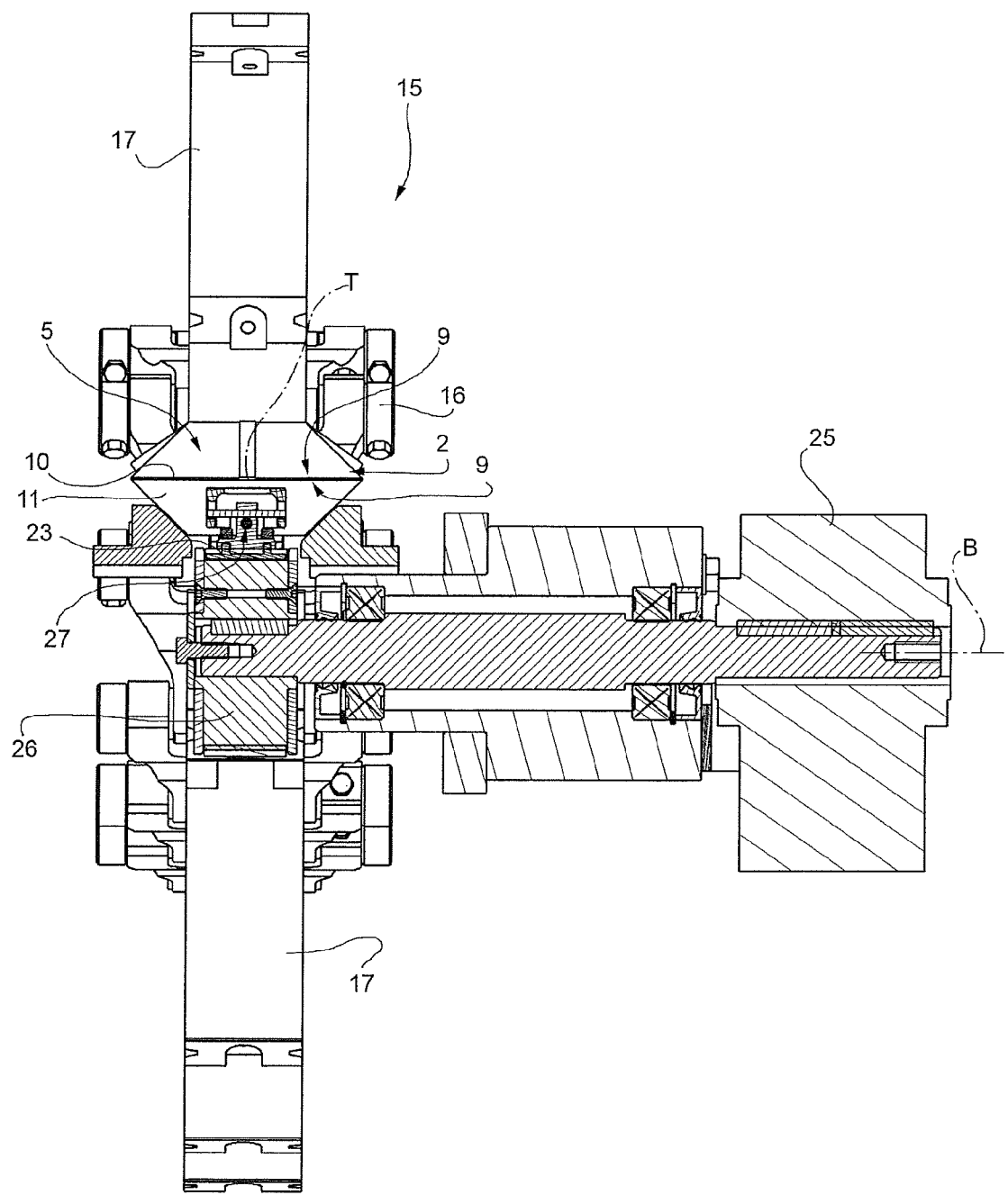
FIG. 3 is section in an enlarged scale taken along line III-III of FIG. 2.
Figure 4:
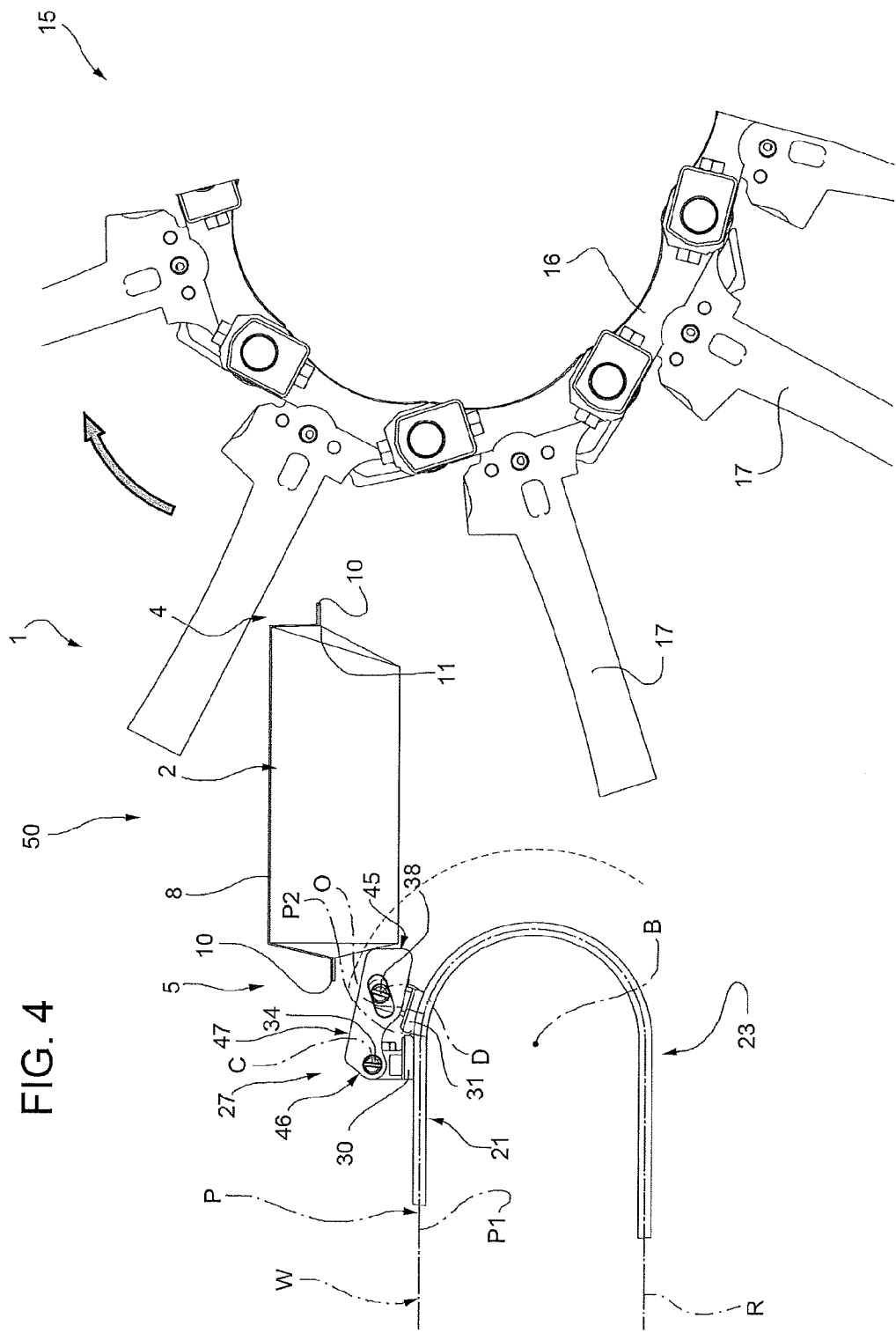
FIGS. 4 and 5 show two different operative conditions of the feeding unit of FIGS. 1 and 2, in an enlarged view and with parts removed for clarity.

Feeding conveyor 21 comprises (FIG. 2):
a frame 22;
an endless conveying element, a belt 23 in the embodiment shown, interposed between chute 20 and folding unit 15; and
a driven pulley 24 rotatable about an axis A; and
a driving pulley 26 rotatable about an axis B and driven in rotation by a motor 25 (shown in FIG. 3).

Axis B is, in the embodiment shown, parallel to axis A.

Frame 22 comprises, in turn, a pair of stationary rails 28 (FIG. 1), which extend from chute 20 beyond the outlet station O of feeding unit 1 up to an inlet station of folding unit 15.

In the embodiment shown, axis A, B are horizontal, in use, and belt 23 lies in a vertical plane.

Stretch P2 is configured as an arch having its centre on axis B.

Belt 23 comprises, in turn, a plurality of push members 27 equally spaced along belt 23.

Each push member 27 comprises a wall 45, which contacts pack 2, as push member 27 is driven by belt 23 along work portion W of path P.

As it moves along the return path R of path P, each push member 27 does not convey any respective pack 2.

Push members 27 move at the same speed of belt 23, as they travel along stretch P1 of path P.

Push members 27 are arranged on the opposite side of belt 23 with respect to axes A, B.

Accordingly, push members 27 are arranged at a greater distance from axis B than belt 23.

Conveyor 21 further comprises (FIGS. 6 and 7) support means 29 for supporting push members 27 with respect to belt 23.

Figure 5:
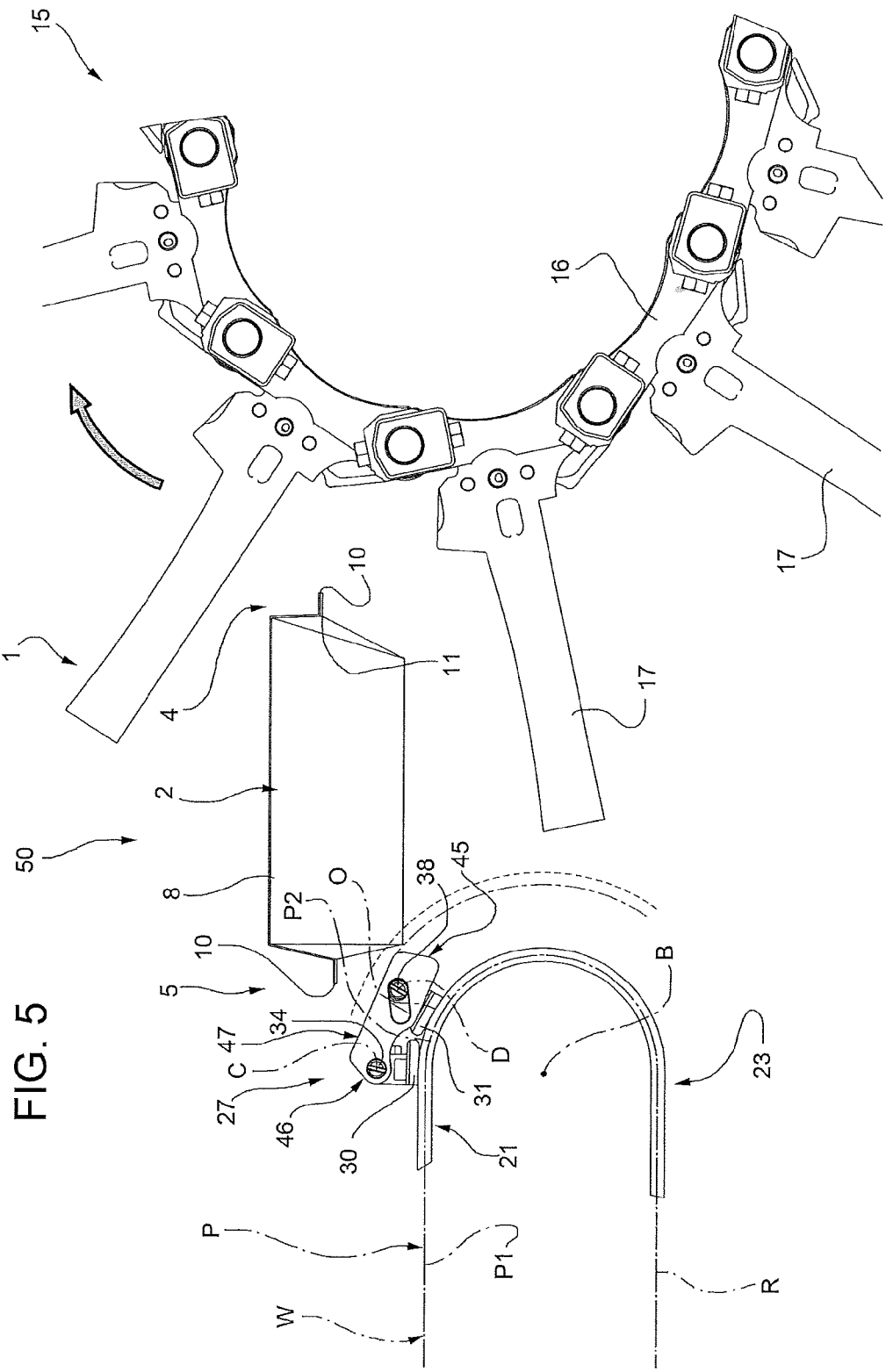

Advantageously, push members 27 are connected to relative support means 29 in such a way that the rotation of support means 29 along stretch P2 of path P causes the movement of wall 45 towards belt 23 (FIGS. 5 and 7).

In the embodiment shown, the rotation of support means 29 along stretch P2 causes the movement of wall 45 also towards axis B.

In this way, when each push member 27 moves on stretch P2 of path P, relative wall 45 approaches axis B, thus reducing the tangential speed thereof and of relative pack 2 at outlet station O (FIGS. 5 and 7).

This reduction of the tangential speed of wall 45 compensates the increase of the tangential speed of wall 45, which would occur along stretch P2, due to the fact that wall 45 is farther than belt 23 from axis B (FIG. 5).

In greater detail, support means 29 comprise, for each push member 27, a support member 30 and a support member 31; each push member 27 is articulated to support member 30 and is connected in a slidable way to support member 31.

The pairs of support members 30, 31 are arranged at a constant pitch along belt 23.

In the following of the present description, only one push member 27 and the corresponding one support member 30 and one support member 31 will be described, being push members 27 and support members 30, 31 identical to one another.

In greater detail, support member 31 is arranged downstream of support member 30, proceeding along path P according to the advancing direction of packs 2.

Support member 30 comprises (FIGS. 5 to 7):
a base 32 connected to belt 23; and
a body 33 protruding from base 32 on the opposite side of belt 23.

Body 33 supports a pin 34 rotatably about an axis C orthogonal to path P.

In detail, pin 34 protrudes from both the lateral sides of body 33.

Support member 31 comprises (FIGS. 5 to 7):
a base 36 connected to belt 23; and
a body 37 protruding from base 36 on the opposite side of belt 23.

Body 37 supports a pin 38 rotatable about axis D, which is parallel to axis C and orthogonal to path P.

In detail, pin 38 protrudes from both the lateral sides of body 37.

Axes C, D are, in the embodiment shown, parallel to axes A, B and transversal to path P.

Support members 30, 31 are not directly connected to one another, i.e. they are made by two distinct pieces individually connected to belt 23.

Accordingly, the distance between homologous points of support members 30, 31 measured parallel to path P can vary, as a result of the movement of belt 23.

In particular, when support members 30, 31 move along stretch P1 of path P, the distance between homologous points of bases 32, 36 remains constant (FIG. 6).

Differently, when support members 30, 31 moves along stretch P2 of path P, base 36 moves away from base 32.

Accordingly, the distance between homologous point of bases 32, 36 increases (FIG. 7).

Pin 34 of support member 30 is hinged to push member 27 about axis C, which is fixed with respect to belt 23. In other words, axis C and belt 23 move integrally to each other along path P.

Pin 38 of support member 31 can both rotate with respect to push member 27 about axis D and slide with respect to push member 27 along a direction E transversal to axes C, D and to path P.

In other words, pin 38 of support member 31 is hinged to push member 27 about axis D, and push member 27 is movable along direction E with respect to belt 23.

In the embodiment shown, push member 27 comprises (FIGS. 6 and 7):
wall 45, which is adapted to cooperate with wall 9 of portion 5 of pack 2 to push it along path P;
a wall 46, which is opposite to wall 45, proceeding along path P;
a wall 47 interposed between walls 45, 46 and arranged on the opposite side of belt 23; and
a pair of walls 48 parallel to each other, spaced parallel to axes C, D and protruding from wall 47 towards belt 23.

In the embodiment shown, wall 45 is arranged downstream of wall 46, proceeding along path P according to the advancing sense of packs 2.

Wall 45 is flat and is sloped, in a plane orthogonal to path P, with respect to axes C, D.

In particular, wall 45 diverges from axes C, D, proceeding from wall 47 towards support members 30, 31.

Walls 48 comprises:
respective downstream portions 39, which are hinged to pin 34 about axis C; and
respective upstream portions 40, which defines respective through slots 42.

Walls 48 extend orthogonally to axes C, D.

Each slot 42 has a length along direction E and a width orthogonal to direction E.

Slots 42 are engaged by pin 38 of support member 31.

In particular, the width of slot 42 orthogonal to direction E corresponds to the diameter of pin 38 while the length of slot 42 along the direction E is greater than the diameter of pin 38.

Each slot 42 is sloped with respect to path P and extends at decreasing distances from wall 47, proceeding from wall 46 towards wall 45.

In other words, slot 42 is sloped with respect to path P and extends at increasing distance from belt 23 and axis C, proceeding from wall 46 towards wall 45.

Furthermore, slot 42 comprises (FIGS. 6 and 7):
an end 43 closer to belt 23 and axis C, and arranged on the side of wall 46; and
an end 44 farther from belt 23 and axis C, and arranged on the side of wall 45.

End 44 is arranged downstream of end 43, proceeding along path P according to the advancing sense of belt 23.

When support members 30, 31 move along stretch P1 of path P, pin 38 engages end 43 (FIG. 6).

When support members 30, 31 move along stretch P2 of path P, slot 42 moves with respect to pin 38 (FIG. 7).

Accordingly, pin 38 moves from end 43 towards end 44.

The operation of feeding unit 1 is described with reference to only one push member 27, to relative pack 2 and to relative support members 30, 31.

Motor 25 advances belt 23 at a constant speed along path P.

Push member 27 receives pack 2 from chute 20 at station I, conveys it along stretches P1, P2 of work portion W of path P, up to reach outlet station O.

In particular, as push member 27 advances pack 2 along work portion W of path P, wall 45 contacts and pushes wall 9 of portion 5 of pack 2.

When it moves along stretch P1 of path P, push members 27 moves at the same speed of belt 23.

Furthermore, when push member 27 moves along stretch P1 of path P (FIG. 6), the distance between homologous points of support members 30, 31 remains constant and, therefore, axes C, D remain substantially parallel to path P.

In this condition, pin 38 of support member 31 engages end 43 of slot 42.

When push member 27 moves along stretch P2 of path P, it moves at a greater distance than belt 23 from axis B.

Furthermore, when push member 27 moves along stretch P2 of path P, support members 30, 31 moves along an arch-shaped trajectory.

Accordingly, support member 31 moves away from support member 30, as shown in FIG. 7.

Due to the fact that it is hinged about axis C to support member 30, push member 27 rotates about axis C and wall 45 moves towards axis C and belt 23.

Accordingly, the increase of speed due to the fact that push member 27 moves along curved stretch P2 at a greater distance than belt 23 from axis B is compensated by the fact that wall 45 and, therefore, pack 2 moves towards belt 23 and axis B, thus reducing its radius of curvature.

As a result, the speed of pack 2 contacting wall 45 is not increased by the fact that push member 27 moves along curved stretch P2 upstream of outlet station O and at a greater distance than belt 23 from axis B.

Furthermore, slot 42 slides with respect to pin 38 and along direction E, up to a position in which pin 38 engages end 43 of slot 42.

Pack 2 can be thus released substantially at constant speed at outlet station O. Then pack 2 moves along rails 28, up to reach folding unit 15.

At this stage, a paddle 17 conveys pack 2 along the folding path, in which it is folded to form a finished package.

Push member 27 moves along return portion R of path P.

The advantages of feeding unit 1 according to the present invention will be clear from the foregoing description.

In particular, push members 27 are connected to support members 30, 31 in such a way that the movement of support members 30, 31 along stretch P2 of path P causes the movement of wall 45 towards belt 23 and axis B.

In this way, wall 45, when moving along stretch P2, is:
on one hand, accelerated due to the fact that it is radially outer than belt 23 with respect to axis B; and
on the other hand, decelerated due to the fact that it moves towards wall 45, i.e. approaches to axis B.

The above-identified acceleration and deceleration compensate, thus keeping the speed of wall 45 along stretch P2 substantially equal to the speed of wall 45 along stretch P1 of work portion W.

In other words, the speed of wall 45 and, therefore, of pack 2 along work portion W remains substantially constant.

In this way, packs 2 are subjected to a substantially constant and homogeneous thrust all along work portion W and, in particular, at the outlet station O where they are released from feeding conveyor 21 towards folding unit 15.

Therefore, the risk to penalize the correct shape of packs 2 along work portion P is dramatically reduced, because the substantially constant speed of packs 2 minimizes the risk of impacts between packs 2 and paddles 17 of folding unit 15.

Furthermore, support means 29 comprise, for each push member 27:
support member 30, to which push member 27 is hinged about axis C; and
support member 31, with respect to which push member 27 can rotate about axis D and slide along direction E.

In this way, when support members 30, 31 move along stretch P and move with respect to one another, push member 27 can rotate about axis C with respect to support member 30 and slide along direction E with respect to support member 31 and towards axis B.

Wall 45 is flat. Accordingly, when belt 23 and path P lie in a vertical plane—i.e. when axes A, B are horizontal—there is no risk that walls 45 slides below packs 2, thus altering the trajectory of packs 2.

Clearly, changes may be made to feeding unit 1 and to the method as described and illustrated herein without, however, departing from the scope defined in the accompanying Claims.

In particular, push members 27 could be carried by the side of belt 23 arranged towards the centre of curvature of stretch P2 of path P, and the movement of support members 30, 31 could cause the movement of push members 27 on the opposite side of the centre of curvature of stretch P2 and, therefore, towards belt 23.

The invention claimed is:

1. A feeding unit for feeding at least one sealed pack of pourable food products to a folding unit configured to form folded packages from said pack; said feeding unit comprising:
an endless belt possessing a surface on which the at least one sealed pack is positioned during the feeding of the sealed pack;
a motor operatively connected to the endless belt to move the endless belt along a closed path to advance, in an advancing direction, the at least one sealed pack positioned on the surface of the endless belt;
at least one push member carried by said endless belt, movable cyclically along the closed path, and comprising, in turn, a wall adapted to contact said pack; and
support means mounted on the endless belt and movable together with the endless belt for supporting said push member on said endless belt so that the push member moves together with the endless belt;
said closed path comprising an inlet station at which said push member receives, in use, said pack, and an outlet station, at which said push member discharges, in use, said pack;
said closed path comprising a curved first stretch, which defines said outlet station;
wherein said push member is connected to said support means in such a way that the movement of said support means along said curved first stretch causes the movement of said wall towards said endless belt.

2. The feeding unit of claim 1, wherein said support means comprise a first support member and a second support member;
said push member being articulated with respect to said first support member and being connected in a slidable way with respect to said second support member.

3. The feeding unit of claim 2, wherein one of said push member and said second support member defines a slot, and the other one of said push member and said second support member defines a pin slidable inside said slot.

4. The feeding unit of claim 3, wherein said slot is elongated along a direction and said pin is slidable inside said slot parallel to said direction.

5. The feeding unit of claim 4, wherein said pin is rotatable with respect to said slot about a first axis transversal to said direction.

6. The feeding unit of claim 4, wherein said direction is sloped with respect to said path.

7. The feeding unit of claim 4, wherein said push member is hinged to said first support member about a second axis transversal to said direction.

8. The feeding unit of claim 4, wherein said slot has a first end and a second end opposite to each other along said direction;
said first end being arranged upstream of said second end, proceeding along said path according to the advancing direction of said push member;
said first end being engaged by said second pin, when said push member moves along a rectilinear second stretch of said path;
said second end being engaged by said second pin, when said push member moves along said curved first stretch.

9. The feeding unit of claim 3, wherein said push member comprises said slot and said second support member comprises said pin.

10. The feeding unit of claim 2, wherein said second support member is arranged downstream of said first support member, proceeding according to the advancing direction of said first support and second support member along said closed path.

11. The feeding unit of claim 1, wherein said closed path comprises a rectilinear second stretch, which is arranged upstream of said first stretch.

12. The feeding unit of claim 2, wherein said first support member and said second support member are carried by said endless belt independently from each other.

13. The feeding unit of claim 12, the distance between points of said first support member and said second support member being constant along said curved first stretch of said path and being increasing along a second rectilinear stretch, proceeding according to the advancing direction of said push member towards said outlet station.

14. The feeding unit of claim 1, wherein said closed path lies, in use, in a vertical plane.

15. The feeding unit of claim 1, wherein said wall is flat.

16. A packaging machine comprising:
a feeding unit according to claim 1; and
a folding unit adapted to receive said pack at said outlet station of said feeding unit and configured to form a folded package from said pack.

17. A feeding unit for feeding at least one sealed pack of pourable food product to a folding unit configured to form folded packages from the pack, the feeding unit comprising:
a belt that moves along a path, the path including a rectilinear stretch and a curved stretch;
a push member comprising a first wall;
a base connected to the belt so that the base moves together with the belt along the path, and a body movable with the base and extending from the base in a direction away from the belt;
a pin projecting away from the body;
the first wall including no more than one non-circular slot, the pin being positioned in the non-circular slot so that the pin is rotatable relative to the first wall and is movable relative to the first wall along the non-circular slot;
the push member being movable together with the belt along the path, the push member including a second wall configured to contact the sealed pack of pourable food product and move the sealed pack of pourable food product along the rectilinear stretch of the path; and
the second wall of the push member moving towards the belt as the base moves along the curved stretch of the path.

18. The feeding unit according to claim 17, wherein the base is a first base, the body is a first body and the pin is a first pin, further comprising a second base connected to the belt so that the second base moves together with the belt along the path, a second body movable with the second base and extending from the second base in a direction away from the belt, and a second pin projecting away from the second body, the first wall of the push member including no more than one circular hole spaced from the non-circular slot, the second pin being positioned in the circular hole.

19. The feeding unit according to claim 17, wherein the second wall is flat and is at a forward end of the push member relative to a direction of movement of the push member.

20. The feeding unit according to claim 17, wherein the second pin possesses an axis, the push member rotating about the axis as the first base moves along the curve section of the path.

21. A feeding unit for feeding a plurality of individual sealed packs of pourable food products to a folding unit configured to form individual folded packages from the individual sealed packs, the feeding unit comprising:
an endless belt possessing a surface on which the sealed packs are positioned during the feeding of the sealed packs;
a motor operatively connected to the endless belt to move the endless belt along a closed path to advance, in an advancing direction, the sealed packs positioned on the surface of the endless belt;
a plurality of spaced-apart first support members fixed to the endless belt so that the first support members move together with the endless belt during movement of the endless belt along the closed path;
a plurality of second support members fixed to the endless belt so that the second support members move together with the endless belt during movement of the endless belt along the closed path;
a plurality of push members each connected to a respective one of the first support members and a respective one of the second support members by way of only two pins that are each positioned in a respective hole so that movement of the endless belt and the first and second support members results in movement of the push members, the only two pins including a first pin and a second pin, the respective holes including a first hole and a second hole, the second hole being an elongated slot, the first pin being positioned in the first hole and the second pin being positioned in the elongated slot, the push member comprising a wall to contact the sealed pack;
the closed path comprising an inlet station at which the push members receive, in use, the sealed packs, and an outlet station, at which the push members discharge, in use, the sealed packs;
the closed path comprising a curved first stretch, which defines the outlet station; and
the push members being mounted on the respective first and second support members in such a way that the movement of the first and second support members along the curved first stretch causes the push member to rotate about an axis passing through the first hole and to move relative to the second support member so that the slot and the second pin move with respect to one another in a manner causing movement of the wall towards the endless belt.

\* \* \* \* \*